United States Patent [19]
Janik et al.

[11] Patent Number: 5,938,921
[45] Date of Patent: Aug. 17, 1999

[54] WATER BAFFLE FOR FILTER CARTRIDGE

[75] Inventors: Leon P. Janik, Suffield; Michael J. Williams, Glastonbury, both of Conn.

[73] Assignee: Stanadyne Automotive Corp., Windsor, Conn.

[21] Appl. No.: 08/887,775

[22] Filed: Jul. 30, 1997

[51] Int. Cl.$^6$ .................................................. B01D 43/00
[52] U.S. Cl. ........................... 210/304; 210/307; 210/320
[58] Field of Search .................................. 210/304, 307, 210/320, DIG. 6, DIG. 5; 55/331, 413, 447, 456, 457, 463, 464

[56] References Cited

U.S. PATENT DOCUMENTS

| | | | |
|---|---|---|---|
| 661,758 | 11/1900 | Doughty . | |
| 2,302,116 | 11/1942 | Gill | 210/131 |
| 3,538,684 | 11/1970 | Esterhoy, Jr. et al. . | |
| 4,017,397 | 4/1977 | Copeland | 210/305 |
| 4,091,265 | 5/1978 | Richards et al. | 210/184 |
| 4,179,273 | 12/1979 | Montusi | 55/457 |
| 4,684,345 | 8/1987 | Cattani | 55/421 |
| 5,078,875 | 1/1992 | Losing | 210/394 |
| 5,110,460 | 5/1992 | Gilas | 210/304 |

*Primary Examiner*—David A. Reifsnyder
*Attorney, Agent, or Firm*—Alix, Yale & Ristas, LLP

[57] ABSTRACT

An improved fuel filter cartridge can be used with a header of a conventional fuel filter assembly. The cartridge has a water coalescing sock filter enclosed within a housing and a generally conically shaped water separating baffle with a spiralling rim and an outer barrier at the lower periphery of the baffle. As water droplets coalesce and fall off the bottom end of the sock filter, they are intercepted by the water baffle and coalesce on the radially inward side of the downwardly spiralling rim and the radially inward side of the outer barrier. As the water droplets spiral outwardly toward the outer barrier, they agglomerate. The water, thus separated and routed away from the fuel stream, exits the water baffle at an outlet of the outer barrier and falls to the bottom of the filter cartridge under the influence of gravity. In some embodiments of the filter cartridge, the conical water baffle can have one or more vents disposed along the radially outward edge of the spiralling rim in order to allow greater effective water depth within the cartridge.

17 Claims, 2 Drawing Sheets

WATER BAFFLE FOR FILTER CARTRIDGE

BACKGROUND OF THE INVENTION

1. Field of the Invention

The present invention generally relates to enhancements in devices for filtering and separating liquids. More particularly, the present invention relates to fuel filters for removing foreign particles and separating water from fuel of a fuel supply system associated with an internal combustion engine. Accordingly, the general objects of the present invention are to provide novel and improved methods and apparatus of such character.

2. Description of the Related Art

Diesel fuel supplies frequently contain significant quantities of abrasive particles and water which present the potential for permanent damage to the components of the fuel injection pump, the fuel delivery system and other components of the engine. Consequently, an effective fuel filter assembly for removing such particles and water from the fuel is a practical necessity and is conventionally incorporated into the fuel supply system of a diesel engine. A multitude of conventional fuel filter assemblies employ a disposable filter cartridge which is replaced at pre-established intervals of filter usage. Such filter cartridges typically perform the dual function of removing particulate material from the diesel fuel and separating water from the fuel.

The fuel filter assemblies to which the present invention relates include a replaceable filter cartridge and a header with a base which accepts the disposable filter cartridge. The filter cartridge has a housing which defines an opening at one end thereof to provide fuel communication between the fuel delivery system and a filter element disposed within the cartridge housing. A sealing grommet is disposed at the opening to provide a fluid-tight seal. The fuel filter cartridges may house a single stage filter or a dual stage filter and may assume a wide variety of shapes and configurations.

Conventional headers used with such fuel filter assemblies include a fuel entry port which is in fluid communication with a central axial fuel conduit for transporting fuel to be filtered into the filter cartridge. Additionally, a fuel exit port of the header is fluidly connected to a coaxial fuel conduit disposed about the central fuel conduit and cooperating therewith to define a fuel exit passage therebetween. Thus, fuel to be filtered conventionally enters the fuel cartridge via the central fuel conduit, is filtered therein and then exits the filter cartridge via the fuel exit passage which surrounds the central fuel conduit. Recent developments have included reversing the operation of the central fuel conduit and the fuel exit passage.

In such conventional fuel filter assemblies, water separation has often been achieved by employing a filter element which comprises a continuous fan-shaped, pleated configuration symmetrically disposed within the filter cartridge and possessing water coalescing properties. In such a filter element, fuel is allowed to pass therethrough, but water is not. Thus, water droplets form at the outside of the filter element and fall to the bottom of the filter cartridge. A drain cock is often mounted at the bottom of the filter cartridge for draining the collected water from the filter. Other filter cartridges employ a filter sock to perform the particulate matter removing and water separating functions. In such sock filters, water is removed from the fuel and coalesces at the sock filter, but the water is also allowed to pass through the sock filter in the form of water droplets. Such designs rely on the force of gravity to pull the water droplets to the bottom of the filter and away from the fuel stream so that the water does not, once again, become swept away with the fuel stream. Naturally, such designs cannot guarantee that the water droplets removed from the fuel will not reenter the fuel stream thereby defeating the purpose of water separation in the first place. In fact, this deficiency may be particularly acute in filter cartridges employing sock filters because the water is not entirely prevented from passing through the sock filter, but is merely forced to coalesce and pass therethrough at a different rate than the fuel.

Accordingly, there is a need in the art for improved fuel filter cartridges and methods therefor which more effectively separate water from the fuel stream as the fuel passes through the filter cartridge.

SUMMARY OF THE INVENTION

Briefly stated, the invention in one embodiment is an improved fuel filter cartridge for use with a header of a conventional fuel filter assembly. The cartridge comprises a housing which defines an opening and a sock filter enclosed within the housing. The improved filter cartridge further comprises a generally conically shaped water separating baffle preferably having a downwardly spiralling wall or rim and an outer barrier or fence at the lower periphery of the baffle. The improved filter cartridge of the present invention is preferably used with a header of the type having a base for mounting the improved filter cartridge to the header, a fuel entry port, a fuel exit port, a central first conduit for interiorly defining a first axial fuel passage and a second fuel conduit surrounding and cooperating with the first conduit to define a second axial fuel passage therebetween. The present invention encompasses embodiments in which the central first conduit is fluidly connected with either the entry port or the exit port of the header and the second axial fuel passage is fluidly connected with the other of the entry or exit port of the header. The present invention can also be easily adapted for use with conventional headers of other configurations.

In filter cartridges employing the present invention, the conical water baffle is disposed below and in spaced relation to the sock filter. Thus, as water droplets coalesce and fall off the bottom end of the sock filter, they are intercepted by the water baffle and coalesce on the radially inward side of the downwardly spiralling rim and the radially inward side of the outer fence or barrier. As the water droplets spiral outwardly toward the outer fence, they agglomerate in still larger quantities. The water, thus separated and routed away from the fuel stream, exits the water baffle at an outlet port of the outer fence and falls to the bottom of the filter cartridge under the influence of gravity. Since the water has a greater opportunity to agglomerate as it traverses the length of the spiralling rim and since the water exits the water baffle at the periphery of the filter cartridge, the risk that the separated water will reenter the fuel stream is greatly diminished. In a preferred embodiment, the conical water baffle can have one or more vents disposed along the radially outward edge of the spiralling rim in order to allow greater effective water depth within the cartridge. The preferred water baffle can also have a roof covering each of the vents so that water droplets incident to the roof are guided away from the vent and do not reenter the fuel stream through the vents.

The methods and apparatus of the present invention provide significant advantages over the above-discussed related art. For example, by using the methods and apparatus of the present invention, more effective water separation can be achieved. Naturally, this improvement in water separation yields a concomitant increase in the purity of the fuel stream exiting the filter cartridge and thereby provides a fuel stream which is far less likely to damage downstream components.

It is accordingly an object of the present invention to provide an improved fuel filter cartridge for use with conventional fuel filter assemblies which water is more effectively separated from the fuel passing through the filter cartridge.

It is a further object of the present invention to provide an improved fuel filter cartridge for use with conventional fuel filter assemblies which employs a generally conically shaped water separating baffle to improve the water separating capabilities of the fuel filter and to thereby improve the purity of the fuel stream exiting the filter cartridge.

Numerous other objects and advantages of the present invention will become apparent to those of ordinary skill in the art from the following specification, from the claims and from the accompanying drawings.

BRIEF DESCRIPTION OF THE DRAWINGS

The preferred embodiment of the present invention will be described below with reference to the accompanying drawings wherein like numerals represent like components and wherein.

DESCRIPTION OF THE PREFERRED EMBODIMENT

The preferred embodiment of the filter cartridge according to the invention will be described below with joint reference to FIGS. 1–3. The inventive cartridge 12 depicted therein incorporates the present invention into an embodiment designed for use with a diesel engine. However, it will also be appreciated that the instant invention can be incorporated into other styles of known fluid filters for use in a wide range of environments and for use with a wide range of other fluids.

Figure 1:
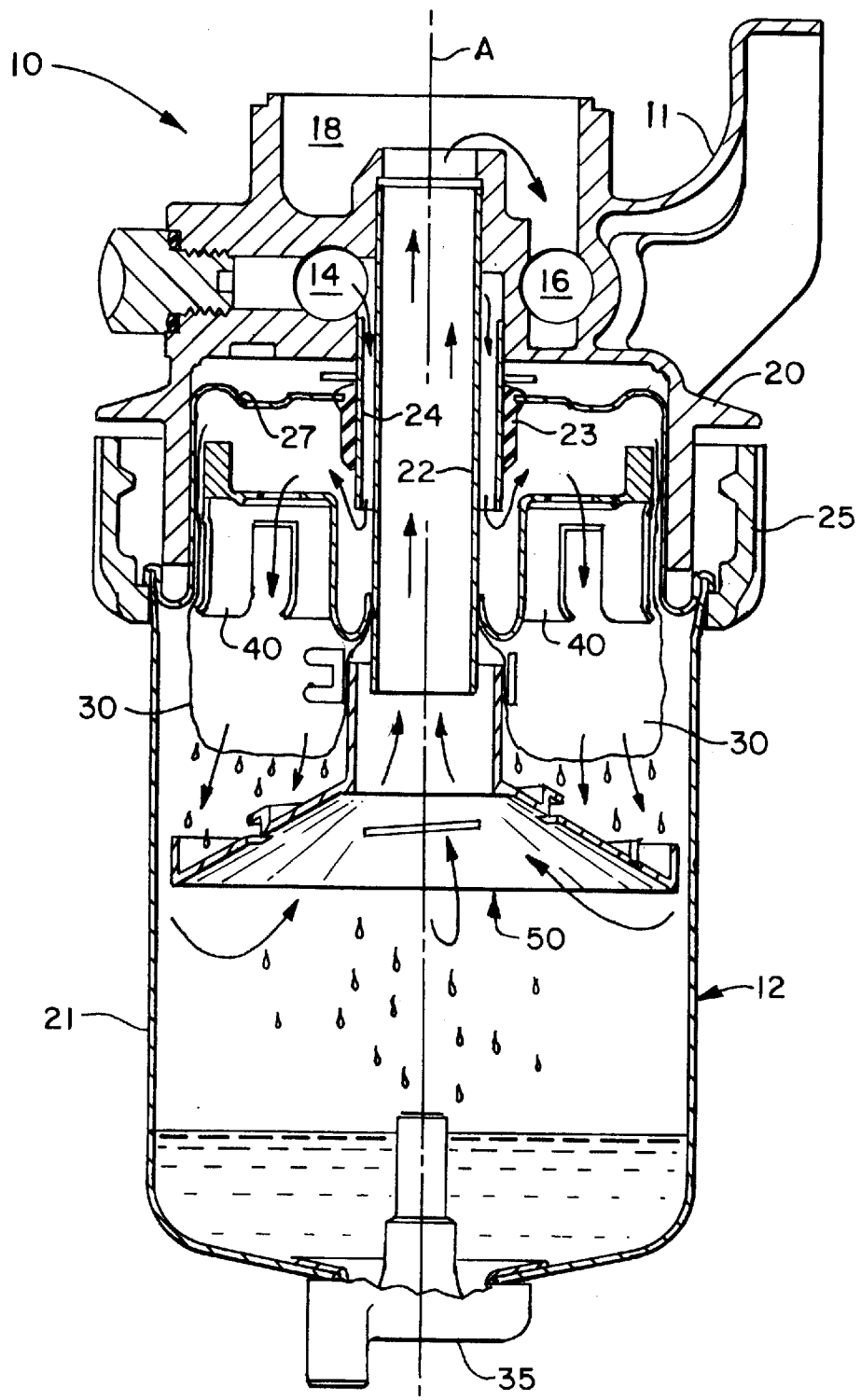
FIG. 1 is a sectional elevational view of a filter cartridge in accordance with one embodiment of the present invention shown in combination with a header of the related art.

The preferred fuel filter cartridge 12 is depicted in combination with a conventional header 10 in FIG. 1. As shown therein, filter cartridge 12 employs a water baffle 50 of FIGS. 2 and 3. Filter cartridge 12 can be mounted to a base 20 of conventional header 10 via a retaining collar or ring 25 to form an improved fuel filter assembly. Header 10 comprises a body 11 which defines a fuel exit port 14, a fuel entry port 16, base 20 and a reservoir 18. Additionally, header 10 includes a first central fuel conduit 22, which is in fluid communication with reservoir 18 and fuel entry port 16, and a second fuel conduit 24 which is in fluid communication with fuel exit port 14. First and second conduits 22 and 24 are symmetric about axis A defined by the water baffle 50 when cartridge 12 is installed on header 10. When header 10 is operated in the conventional manner, fuel entry port 16 acts as a fuel entry passage and fuel exit port 14 acts as a fuel exit passage. Thus, fuel to be filtered by the fuel assembly conventionally enters header 10 via fuel entry port 16, flows through reservoir 18 and enters a conventional filter cartridge via passage through first conduit 22. After conventional filtration occurs, the filtered fuel enters second conduit 24 and then exits the fuel assembly via fuel exit port 14.

While filter cartridge 12 of the present invention is used with conventional header 10, header 10 is preferably operated in a reverse manner relative to the normal operation thereof. In particular, when header 10 is used in conjunction with the present invention, fuel exit port 14 serves as a fuel entry passage and fuel entry port 16 serves as a fuel exit passage. Consequently, second conduit 24 acts as a fuel entry conduit and first conduit 22 acts as a fuel exit conduit. The fuel flow path through header 10 and cartridge 12 during filtration thereof is generally designated by the arrows in FIG. 1. The water flow path through filter cartridge 12 is generally designated by the droplets in FIG. 1.

As shown in FIG. 1, filter cartridge 12 includes a housing 21, a sock filter 30, a flow-reversing insert 40 and a water drain cock mechanism 35. Housing 21 is generally cylindrical in shape and includes a first end wall 27 which defines an opening having a grommet seal 23 disposed thereon for sealingly engaging the exterior of second conduit 24 when cartridge 12 and header 10 are engaged with one another. At an opposite end of housing 21, housing 21 defines an opening for receiving drain cock 35 as is known in the art.

Cartridge 12 also preferably includes insert 40. Inter alia, insert 40 serves to route fuel entering cartridge 12 via second conduit 24 radially outwardly and in an axial direction away from housing end wall 27.

Sock filter 30 is a conventional filter element disposed about and fixedly attached to insert 40. The lower and opposite end of sock filter 30 is secured at a central region of insert 40 using a clamp or other fastener as known in the art.

Figure 2:
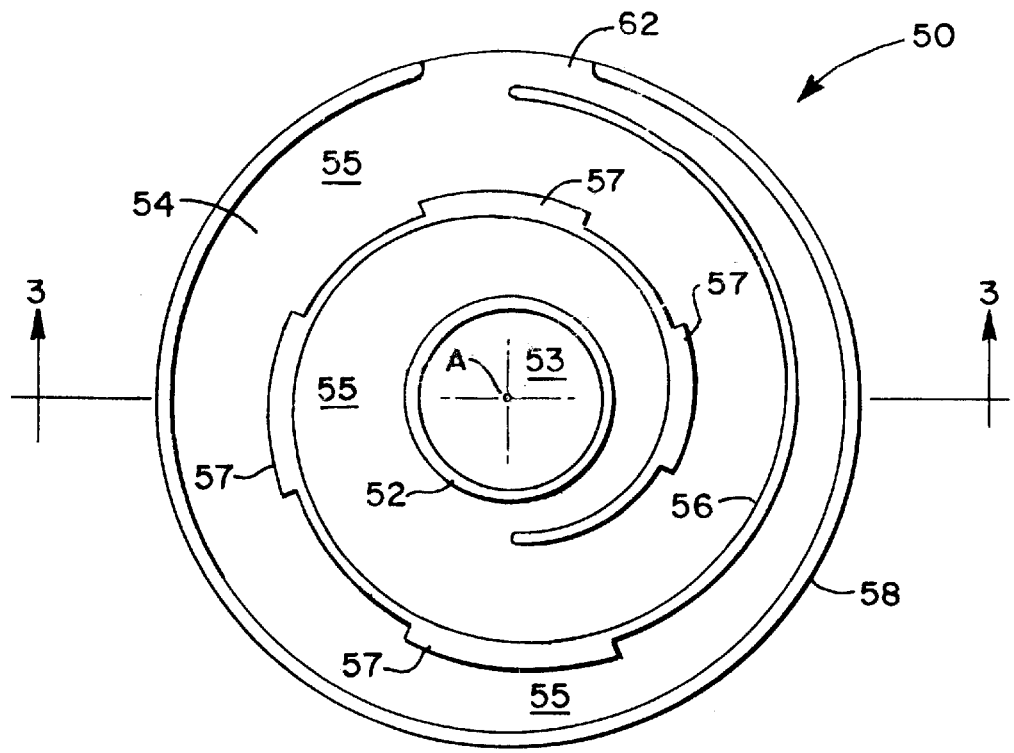
FIG. 2 is a top plan view of a water baffle for use with a fuel filter cartridge in accordance with one embodiment of the present invention.
Figure 3:
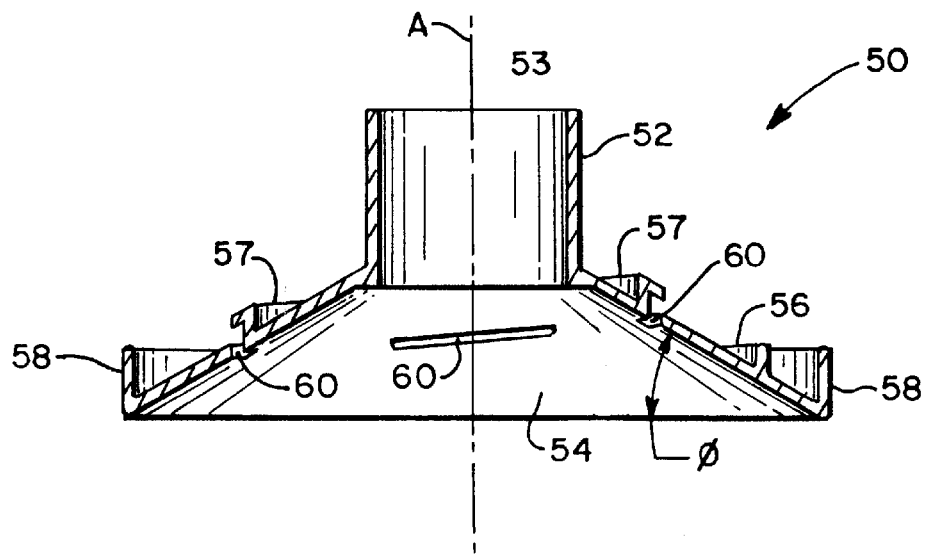
FIG. 3 is a cross-sectional view of the water baffle depicted in FIG. 2, the section being taken along line 3—3 of FIG. 2.

With primary reference to FIGS. 2 and 3, a fuel filter cartridge 12 in accordance with the preferred embodiment of the present invention includes a generally conical water separating baffle 50. Baffle 50 includes generally conical body 54 which slopes downwardly and outwardly at an angle of inclination of Ø when filter cartridge 12 is in an installed orientation. While the preferred angle of inclination Ø is about 30°, the angle of inclination Ø also preferably ranges anywhere from 5° to 60°. As shown, body 54 is symmetric about, and defines, an axis A. A generally cylindrical wall 52 is symmetrically disposed about axis A and extends from the upper portion of body 54. The interior surfaces of wall 52 and body 54 define a fuel exit passage 53 for the flow of fuel therethrough. A spiralling rim spirals radially outwardly and downwardly along the upper surface 55 of body 54. Spiralling rim 56 preferably traverses approximately 540° from start to finish. Alternatively, rim 56 could preferably traverse anywhere from 0° to 720° from start to finish.

A plurality of elongated vents 60 extend through body 54 along the radially outward edge of rim 56. Vents 60 are preferably disposed approximately every 90° traversal along the length of rim 56. A roof 57 preferably extends from the top edge of rim 56 at each vent 60. Roofs 57, thus, shelter vents 60 from the passage of fluid in a directly vertical direction. Rim 56 is preferably about 0.10 inches in height, but preferably varies anywhere from 0.02 inches to 0.80 inches largely depending on the angle of inclination Ø defined by body 54. As best shown in FIG. 2, elongated vents 60 and elongated roofs 57 both preferably sweep an angle of approximately 45° along the length of rim 64 and are preferably disposed approximately every 90°.

An outer barrier or fence 58 preferably extends about the perimeter of body 54 except for a single outlet chute or port 62 which preferably extends along the length of body 54 for approximately 30°. Outer fence 58 is preferably about 0.20 inches in height but preferably ranges from 0.02 to 0.80 inches in height depending, inter alia, on the angle of inclination Ø defined by body 54. As an alternative, outer fence 58 could define a plurality of outlet ports 62, the length of such outlet ports being varied as desired. As best shown in FIG. 2, rim 56 preferably terminates at or near the center of outlet port 62.

Water separation and collection occurs within cartridge 12 in several stages. Water separation first occurs as the previously unfiltered fuel passes through sock filter 30. As noted above, sock filter 30 has water coalescing properties so that water droplets accumulate at an exit region of filter 30. When these water droplets become sufficiently large, they fall from sock filter 30 under the influence of gravity towards upper surface 55 of conical baffle 50. When these water droplets are intercepted by baffle 50, they agglomerate along the radially inner edge of spiralling rim 56. Agglomeration is further enhanced as the water droplets move downwardly and outwardly along rim 56 because forcing the water droplets to traverse this lengthened path as they fall downwardly naturally decelerates the water droplets. This deceleration yields an increased opportunity for the water droplets to agglomerate into still larger water droplets. Water droplets not incident to surface 55 in a location which is radially inwardly of rim 56 will be intercepted and collected along the radially inward edge of outer fence 58. As these water droplets accumulate, they will naturally tend to exit fence 58 at outlet port 62. Similarly, the water droplets guided along rim 56 will exit baffle 50 through outlet port 62. The confluence of these two streams of water offer still another opportunity for enhanced agglomeration. Since the water exiting baffle 50 has experienced dramatic deceleration in the axial direction and since the water exiting baffle 50 preferably does so at one location at the periphery of baffle 50 and at housing 21, the tendency for the water droplets to reenter the fuel stream is greatly reduced. Thus, the water exiting baffle 50 has a strong tendency to fall downwardly under the influence of gravity and accumulate at the bottom of housing 21 about drain cock 35.

Water agglomeration at baffle 50 is further improved by the provision of vents 60 and associated roofs 57. In particular, vents 60 allow the water separated from the fuel to accumulate in greater depths relative to embodiments of the baffle of the present invention not employing vents 60. A roof 57 is provided over each of vents 60 to prevent water droplets incident to roofs 57 from passing through vents 60 and reentering the fuel stream. In essence, water droplets which would otherwise pass through vent 60 are deflected by roofs 57 so that they can be collected by baffle 50. While the present invention has been described in connection with what is presently considered to be the most practical and preferred embodiments, it is to be understood that the invention is not limited to the disclosed embodiments, but is intended to cover various modifications and equivalent arrangements included within the spirit and scope of the appended claims.

What is claimed is:

1. A filter cartridge for removing particulate matter and water from fuel passing therethrough, said cartridge adapted for use with a header of the type capable of supplying fuel to said filter cartridge and receiving therefrom fuel filtered by said filter cartridge when said cartridge is mounted to said header in an installed position, said cartridge comprising:

a housing having at least one opening for permitting the exchange of fuel between the header and said cartridge and a seal which sealingly engages the header when said cartridge is mounted on the header in said installed position;

at least one filter element enclosed in said housing, said filter element intercepting fuel entering said cartridge in said installed position such that particulate matter and water are removed from the fuel passing therethrough and such that the water removed from the fuel coalesces into water droplets which fall from said fuel filter element under the influence of gravity; and a generally conical water separating baffle disposed within said housing below said filter element when said cartridge is in said installed position such that water droplets falling from said filter element are intercepted by said baffle, said baffle having a radially outer barrier disposed substantially entirely about the periphery of said conical baffle whereby water droplets intercepted by said baffle accumulate at the radially inward edge of said barrier, said barrier defining at least one outlet through which water droplets accumulated at the radially inward edge of said barrier can exit said baffle and fall downwardly under the influence of gravity.

2. The filter cartridge of claim 1, wherein said baffle further comprises a generally conical body having a convex top surface and a rim disposed on said top surface, said rim spiralling downwardly and radially outwardly when said cartridge is in said installed position.

3. The filter cartridge of claim 2, wherein said body defines at least one vent extending therethrough along the radially outward edge of said rim and wherein said rim further comprises at least one roof portion located above said vent to prevent fuel and water droplets from passing directly through said vent.

4. The filter cartridge of claim 2, wherein said rim traverses at least approximately 540 degrees along the length thereof, and wherein said rim terminates at a point which is radially aligned with said outlet port.

5. The filter cartridge of claim 2, wherein said barrier defines a plurality of outlet ports.

6. The filter cartridge of claim 2, wherein said baffle is coaxially disposed about an axis and wherein said top surface of said baffle defines an angle of inclination of approximately 60° relative to said axis.

7. A filter cartridge for removing particulate matter and water from raw fuel passing therethrough, said cartridge comprising:

a housing having axially spaced first and second ends, said first end having at least one opening for receiving fuel to be filtered and for transferring filtered fuel out of said cartridge;

at least one filter element disposed in said housing, said filter element intercepting fuel passing through said cartridge such that particulate matter and water are removed from said fuel and such that water removed from said fuel coalesces into water droplets which pass through said filter element; and a generally conical water separating baffle which has a first surface disposed between said filter element and said second end, said baffle defining a central axis and having at least one wall having a terminal end and extending from said first surface and around said central axis for at least about 180 degrees, said wall further having an outer barrier disposed substantially entirely around the periphery of said baffle, said outer barrier defining at least one outlet through which water droplets can exit said baffle, whereby water droplets intercepted by said first surface accumulate at said wall at a radially inward side of said barrier and guidedly exit said baffle from said terminal end of said wall via said outlet.

8. The filter cartridge of claim 7, wherein said first surface is convex and wherein said wall comprises a rim disposed on said first surface, said rim spiralling radially outwardly relative to said central axis.

9. The filter cartridge of claim 7, wherein said baffle includes means defining at least one elongated vent extending therethrough along said wall and at least one elongated roof overhanging said vent.

10. The filter cartridge of claim 7, wherein said baffle further comprises an outwardly spiraling rim having a terminal end disposed on said first surface such that said terminal end thereof is radially aligned with said outlet of said barrier.

11. The filter cartridge of claim 7, wherein said first surface is a convex surface and wherein said first surface cooperates with said central axis to define an angle of inclination between about 30 and 85 degrees.

12. The filter cartridge of claim 9, wherein said baffle includes means defining a plurality of said vents and wherein a plurality of individual roofs extend from said wall to shelter said vents.

13. A separating baffle for use with a filter cartridge of the type which employs a filter element to separate water from another fluid after the mixed water and fluid enter said cartridge, said baffle comprising:

a body having a generally conical portion with a central region and an outer periphery and a generally cylindrical wall extending from said central region of said conical portion, said body being generally disposed about a central axis, said conical portion of said body including a convex top surface and defining at least one elongated vent;

at least one wall extending axially from said top surface of said conical portion, said wall comprising a spiraling rim having a terminal end at least near said outer periphery and extending around said axis for at least about 180 degrees; and a barrier extending at the outer periphery, said barrier defining an outlet;

wherein said vent of said conical portion extends along the radially outward edge of said spiraling rim.

14. The separating baffle of claim 13, wherein said rim spirals radially outwardly from said central region of said conical portion toward said outer periphery of said conical portion.

15. The separating baffle of claim 13 comprising at least one elongated roof portion extending radially outwardly from said rim, said roof portion being in axial alignment with and in spaced relation to said elongated vent.

16. The separating baffle of claim 14, wherein said rim traverses at least approximately 540 degrees along the length thereof, and wherein said terminal end of said rim is radially aligned with said outlet.

17. The separating baffle of claim 14, wherein said rim traverses no more than approximately 720 degrees along the length thereof, and wherein said terminal end of said rim is radially aligned with said outlet.

* * * * *